United States Patent
Lyles, Jr. et al.

(10) Patent No.: US 6,240,490 B1
(45) Date of Patent: May 29, 2001

(54) COMPREHENSIVE MULTILEVEL CACHE PRELOADING MECHANISM IN A MULTIPROCESSING SIMULATION ENVIRONMENT

(75) Inventors: Joseph William Lyles, Jr.; Jen-Tien Yen; Qichao Yin, all of Austin, TX (US); Mark David Griswold, Portland, OR (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/119,310

(22) Filed: Jul. 20, 1998

(51) Int. Cl.[7] ................................................. G06F 12/00
(52) U.S. Cl. .............................................. 711/141; 714/42
(58) Field of Search ..................................... 711/141, 144, 711/145; 714/718, 33, 42; 703/22, 27

(56) References Cited

U.S. PATENT DOCUMENTS

| | | | |
|---|---|---|---|
| 5,025,366 | 6/1991 | Baror | 364/200 |
| 5,136,691 | 8/1992 | Baror | 395/200 |
| 5,185,878 | 2/1993 | Baror et al. | 395/425 |
| 5,297,269 * | 3/1994 | Donaldson et al. | 395/425 |
| 5,371,865 | 12/1994 | Aikawa et al. | 395/400 |
| 5,375,216 | 12/1994 | Moyer et al. | 395/421 |
| 5,404,484 | 4/1995 | Schlansker et al. | 395/425 |
| 5,406,504 * | 4/1995 | Denisco et al. | 364/580 |
| 5,423,016 | 6/1995 | Tsuchiya et al. | 395/425 |
| 5,530,832 | 6/1996 | So et al. | 395/449 |
| 5,627,992 | 5/1997 | Baror | 395/460 |
| 5,717,897 * | 2/1998 | McCrory | 395/468 |
| 5,740,353 * | 4/1998 | Kreulen et al. | 395/183.18 |
| 6,018,791 * | 1/2000 | Arimilli et al. | 711/141 |

FOREIGN PATENT DOCUMENTS 0 732 652 A1    9/1996   (EP).

OTHER PUBLICATIONS

Archibald, James and Baer, Jean–Loup. "Cache Coherence Protocols: Evaluation Using a Multiprocessor Simulation Model". ACM Transactions on Computer Systems, vol. 4, No. 4, Nov. 1986, pp. 273–298.*

* cited by examiner

*Primary Examiner*—Kevin Verbrugge
(74) *Attorney, Agent, or Firm*—Anthony V. S. England; Bracewell & Patterson, L.L.P.

(57) ABSTRACT

For simulation of a multiprocessor system having a multi-level cache hierarchy, possible and legal cache coherency state combinations are classified based on the state of one level one cache, and subclassified within the major classes to define unique combinations, a number significantly less than the number of all possible combinations. For data words in the test case, a cache coherency state combination is randomly selected from a combination table listing all subclasses. Stale data generated by inverting all or part of the original data from the test case may be preloaded with the coherency states as necessary. Existing coherency is maintained when test case data is preloaded to a cache location already preloaded to avoid previously loaded stale data from becoming valid with the new coherency state. Coherency state combinations which are preloaded are tracked to help ensure that all subclasses an are preloaded and tested during simulation prior to tapeout. The cache preload mechanism of the present invention allows bugs which only occur when the caches are in some corner case states to be detected.

20 Claims, 2 Drawing Sheets

COMPREHENSIVE MULTILEVEL CACHE PRELOADING MECHANISM IN A MULTIPROCESSING SIMULATION ENVIRONMENT

BACKGROUND OF THE INVENTION

1. Technical Field

The present invention relates in general to cache preloading for multiprocessor system design simulation and in particular to comprehensive cache preloading ensuring that all possible legal cache coherency state combinations are reached. Still more particularly, the present invention relates to randomly preloading all possible legal cache coherency state combinations during simulation to verify proper design operation even in corner case state combinations.

2. Description of the Related Art:

Caches have traditionally been designed to take advantage of the spatial and temporal locality of code sequences in commercial applications to reduce the memory access latency for load and store instructions by staging data predicted to be needed in the future into smaller memories having shorter latencies. As multiprocessing capabilities have increased in popularity, cache structures have been expanded and improved to support this functionality.

In a multiprocessor system, the same data may be shared and separately cached by different processors. To address the problem of multiple processors modifying the same data in local caches without notifying the other, various cache states have been defined and included into the cache organization to support different cache coherency protocols in snooping mechanisms. While many different cache coherency states have been defined for different multi-processor systems, the MESI protocol states remain very popular basic cache coherency states.

The modified (M) coherency state indicates that only one cache has the valid copy of the data, and that copy is "dirty" or modified with respect to the copy in system memory. The exclusive (E) coherency state is defined to signify that only one cache has a valid copy of the data, which is unmodified with respect to the data in system memory. The shared (S) coherency state denotes that one or more caches have copies of the data and that no copy is modified with respect to system memory. The invalid (I) coherency state indicates that no caches have a valid copy of the data.

In multiprocessor systems employing the MESI protocol or a variant, a processor preparing to store data will first examine the cache coherency state within the local cache corresponding to the store location. If the subject cache line is either modified or exclusive, the store will be performed immediately. Otherwise, the processor seeking to store the data must invalidate all other copies of the data in the memory hierarchy before the store may be safely executed. These protocols are followed by all processors in a multiprocessor system to ensure that data coherency with respect to instruction execution sequences is maintained.

The protocols described, however, can become extremely complicated if multiple levels of caches—including internal or external in-line caches—are implemented for each processor, particularly when 3 or more cache levels are implemented. For single-level cache systems, only horizontal cache coherency across processors need be considered. However, where multi-level cache hierarchies are implemented for each processor, both vertical and horizontal cache coherency must be maintained.

In a multiprocessor system having a multi-level cache hierarchy, the number of legal combinations for cache coherency states among the caches is extremely large. Even if a very thorough methodology were employed, it would not be easy to reach all of the legal combinations by running limited simulation cycles, as is conventional. Some legal combinations may only occur after execution of a complex sequences of many load, store and castout operations.

For instance, in order for data X within the level one (L1) and level two (L2) caches to be in the invalid state in both but in the modified state in the level three (L3) cache, the processor must first store data X to the appropriate address, causing the L1 to be in the modified state. Next, a number of loads or stores (depending on the L1's replacement algorithm) must be executed which map to the cache segment containing addresses including that of data X, forcing a castout of X from the L1 to the L2. Finally, a number of loads and stores which cause L1 misses and also force the L2 to select data X as the victim and castout the cache line containing the modified data from the L2 to the L3 must occur.

The sequence of operations required to reach a particular combination of cache coherency states may entail an extremely large number of operations. Furthermore, the example described above assumes that cache levels are not shared between processors. Many more additional legal combinations of cache coherency states become possible where the several processors and L1 caches share a common L2 and/or L3 cache, further complicating the string of operations necessary to achieve a particular legal combination of coherency states.

Finally, a physical multiprocessor system running any kind of application at several hundred million or more instructions per second will result in the caches filling up within a very short period of time and the system reaching any combination of cache states eventually. In contrast, simulations run tests at a much lower frequency, often less than 100 processor cycles per second. With this limitation, it is not practical to run long test cases—more than a thousand instructions, for example. Therefore, it is nearly impossible to reach all types of cache state combination by running limited simulations without cache preloading. An insufficient or limited preloading mechanism could leave hidden bugs in the design which would not be found until the real silicon comes back.

It would be desirable, therefore, to provide a comprehensive and complete cache preloading mechanism for simulations. It would further be advantageous for the mechanism to employ only possible cache coherency state combinations, excluding those which are legal in theory but could never occur. It would also be desirable for the cache preload mechanism to randomly preload combinations for more complete verification, including corner case combinations.

SUMMARY OF THE INVENTION

It is therefore one object of the present invention to provide an improved cache preloading mechanism for multiprocessor system design simulation.

It is another object of the present invention to provide a comprehensive cache preloading mechanism for multiprocessor system design simulation which ensures that all possible legal cache coherency state combinations are reached.

It is yet another object of the present invention to provide a cache preloading mechanism randomly preloading all possible legal cache coherency state combinations during simulation to verify proper design operation even in corner case state combinations.

The foregoing objects are achieved as is now described. For simulation of a multiprocessor system having a multi-level cache hierarchy, possible and legal cache coherency state combinations are classified based on the state of one level one cache, and subclassified within the major classes to define unique combinations, a number significantly less than the number of all possible combinations. For data words in the test case, a cache coherency state combination is randomly selected from a combination table listing all subclasses. Stale data generated by inverting all or part of the original data from the test case may be preloaded with the coherency states as necessary. Existing coherency is maintained when test case data is preloaded to a cache location already preloaded to avoid previously loaded stale data from becoming valid with the new coherency state. Coherency state combinations which are preloaded are tracked to help ensure that all subclasses are preloaded and tested during simulation prior to tapeout. The cache preload mechanism of the present invention allows bugs which only occur when the caches are in some corner case states to be detected.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
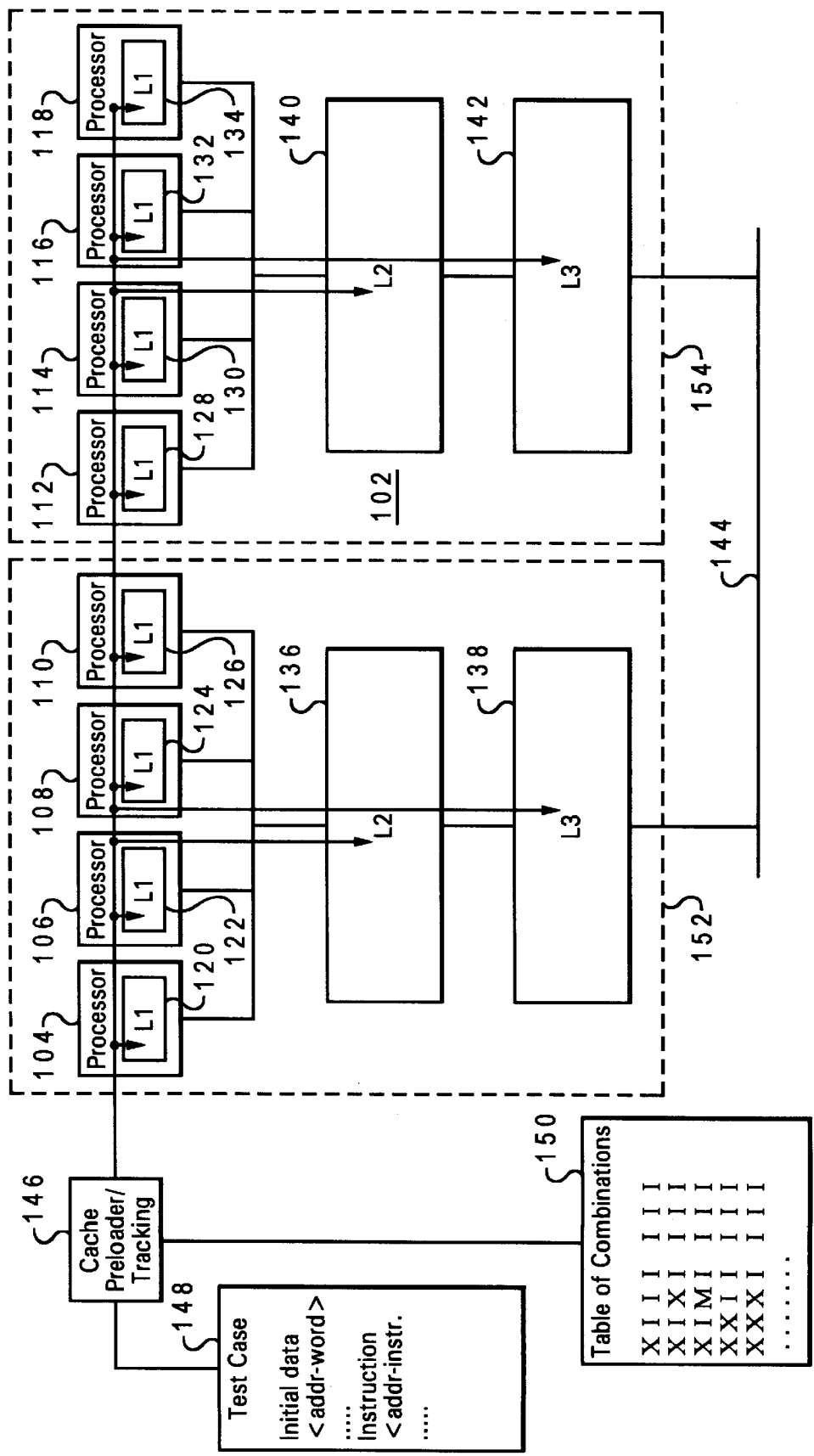
FIG. 1 depicts a block diagram of a multiprocessor system in which a preferred embodiment of the present invention may be implemented.

With reference now to the figures, and in particular with reference to FIG. 1, a block diagram of a multi-processor system in which a preferred embodiment of the present invention may be implemented is depicted. Multi-processing system 102 is preferably implemented as a design simulation, with software modules emulating the behavior of the various components depicted in accordance with the known art. Multiprocessing system 102 includes a plurality of processors 104, 106, 108, 110, 112, 114, 116 and 118, each preferably conforming to the specifications of the PowerPC™ family of processors available from International Business Machines Corporation of Armonk, N.Y. Processors 104–118 each have a respective L1 cache 120, 122, 124, 126, 128, 130, 132 and 134. Processors 104–110 share L2 cache 136 and L3 cache 138 connected inline between the processors and system bus 144. Similarly, processors 112–118 share L2 cache 140 and L3 cache 142 connected inline between the processors and system bus 144.

Multiprocessing system 102 thu includes twelve data caches which need to be initialized, which may be logically treated as two processing units: processing unit 152, comprising processors 104–110, L1 caches 120–126, L2 cache 136 and L3 cache 138; and processing unit 154, comprising processors 112–118, L1 caches 128–134, L2 cache 140 and L3 cache 142. These twelve data caches are preloaded in the present invention by cache preloader/tracking 146, which preloads the caches to desired coherency state combinations and tracks the preloaded coherency state combinations to make sure that all combinations occur in a random simulation.

Cache preloader 146 reads data and instructions from a test case 148 one word at a time, and following the process described below, preloads the caches 120–142 at all three levels with both cache coherency states and data and preloads the main memory with data/instructions only (no coherency states). Either a fixed preload method (specified by the tester) or a random preload method may be employed to preload all possible combinations of cache coherency states. The fixed preload method is relatively straightforward and will not be described; the random preloading method is described below.

Although described above as a simulation of the design depicted in FIG. 1, a physical embodiment of the present invention may be implemented using the components shown together with one or more logic analyzers (not shown) connected to processor and bus card adapters within slots in the system.

Figure 2:
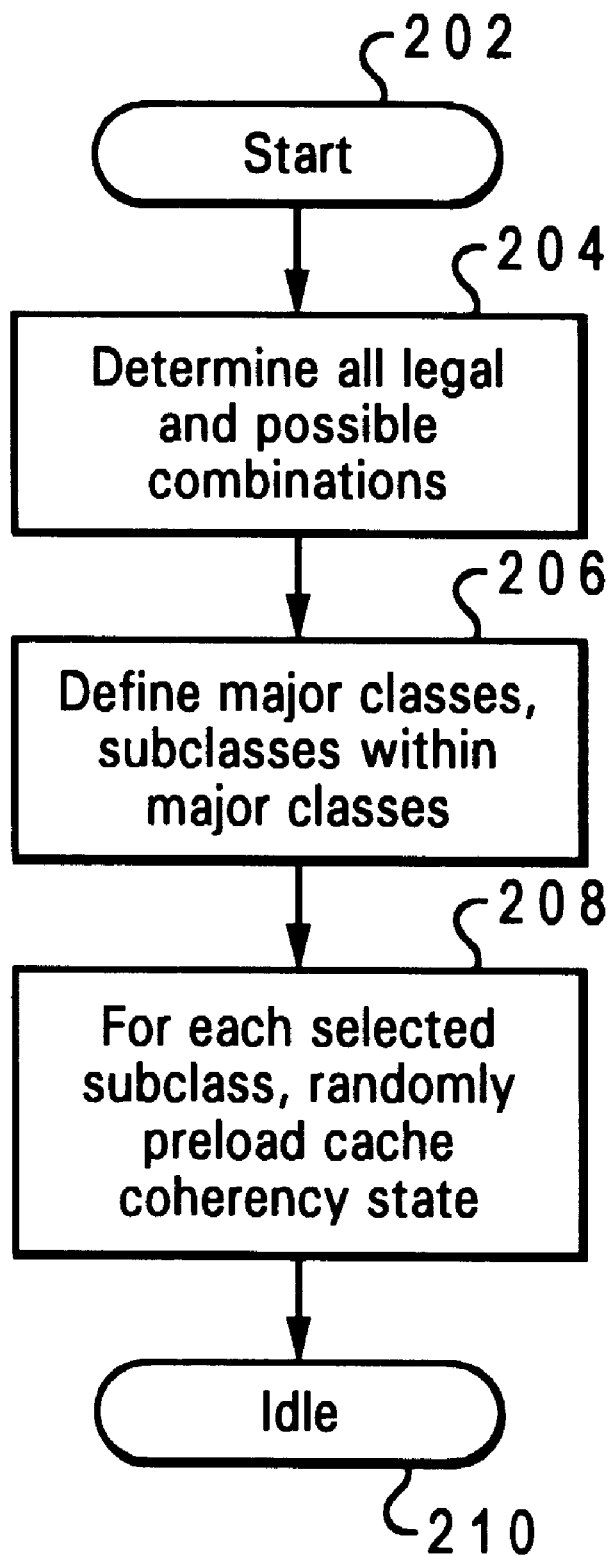
FIG. 2 is a high level flowchart for a process of employing a cache preloading mechanism in accordance with a preferred embodiment of the present invention.

Referring now to FIG. 2, a high level flowchart for a process of employing a cache preloading mechanism in accordance with a preferred embodiment of the present invention is illustrated. The process begins at step 202 and passes to step 204, which depicts determining all possible and legal combinations of cache coherency states possible for the design being simulated.

Only the combinations of coherency states which can occur through execution of a sequence of instructions are of interest, and it is preferably not to waste cycle time simulating coherency state combinations which will never occur although theoretically legal. All possible legal coherency state combinations for multiprocessing system 102 depicted in FIG. 1 are set forth in Appendix I. "INV" indicates that the preloaded cache segment is set to the invalid coherency state; "XU" indicates that the preloaded cache segment is set to the exclusive coherency state; "XM" indicates that the preloaded cache segment is set to the exclusive modified coherency state; and "SH" indicates that the preloaded cache segment is set to the shared coherency state. Asteriks (*) indicate a "don't care" coherency state, and "SD" indicates that the selected cache segment is preloaded with stale data as described in further detail below. Strikeout lines through entries in Appendix I are those entries which, although theoretically legal, will not occur under the PowerPC™ instruction architecture. High-lighted entries are those which can occur if the transient bit associated with a cache segment is set.

Based on defined coherency rules and instructions for a processor architecture, all illegal and legal-but-impossible coherency state combinations are removed from the table of combinations. For example, if the L3 cache is in the shared coherency state, the L1 and L2 caches cannot be in the exclusive coherency state. After removing all of the illegal and impossible cases, there are still several hundred possible coherency state combinations left. Many of these combination are essentially similar. For example, only one L1 cache within a processing unit can be in the exclusive coherency state at a time. However, it does not make any difference if the exclusive data is in the first L1 cache within a processing unit or the last L1 cache within that processing unit.

As another example, if two L1 caches within a processing unit have copies of a cache segment in the shared coherency state, it does not make a difference which two L1's have those copies. Based on these similarities, coherency state combinations may be classified based on the coherency state of an L1 cache within one processing unit. The process thus passes to step 206, which illustrates defining major classes within the possible, legal coherency state combinations based on the coherency state of an L1 cache: exclusive (XU), shared (SH), exclusive modified (XM), or invalid (INV). The combinations table is thereby segregated based on an L1 coherency state. Another is advantage to dividing the coherency state combinations into major classes is that the same or different weights may be assigned to different classes for a random number generator utilized to select combinations from the combination table for preloading. This may help balance different scenarios or put more focus on a desired scenario.

Within each major class, all possible unique subclasses are defined. For multiprocessor system 102 depicted in FIG. 1, only a total of 84 unique subclasses exists. This is a significant and important reduction from all possible combinations since it increases the probability of generating all unique (not similar) combinations for each simulation run. The combinations table is thus reduced to the unique coherency state combinations represented by these subclasses.

The process then passes to step 208, which depicts, for each selected subclass during simulation, randomly preloading the caches. For example, if the subclass in which an L1 is in the exclusive modified (XM) coherency state is selected, the preloader the exclusive modified coherency state into any L1 within a processing unit. As another example, if the subclass having an L1 in the shared (SH) coherency state, the preloader may randomly select how the other L1's in the same processing unit will be preloaded.

The preloading proceeds by randomly selecting a cache state combination from the classed and subclassed coherency state combinations within the combinations table for every data word listed in the test case. If an upper-level cache is preloaded in the exclusive modified coherency state, all caches below it may be loaded with stale data regardless of their coherency state. For instance, if the L1, L2 and L3 are all in the exclusive modified state, stale data should be loaded into the L2 and L3 caches, and even into system all memory. This ensures that the correct data will always come from the cache which owns the data.

One way to preload stale data in the exemplary embodiment is to invert the first half word of the original data pattern when loading into the L2 cache, invert the second half word of the original data pattern when loading into the L3 cache, and invert both halves—the whole word—when loading into system memory. With this method, it becomes very easy to debug a test case which fails with a data miscompare. This does not apply, however, if a higher level device contains the data in the shared coherency state. In the multiple-processor configuration of the exemplary embodiment, it is possible for L1 to be in the shared coherency state but for the L2 to be in the exclusive modified coherency state, which is impossible in traditional single-processor implementations.

When data listed in the test case maps to a cache segment having a coherency state is already preloaded with other data, the same coherency state is maintained. This is because, if the coherency state is randomly generated again, there is a chance that the previously loaded stale data will become valid due to the new coherency state. However, the new data will still be loaded into the corresponding address.

If a cache segment is randomly loaded in the invalid coherency state, stale data with the correct tag will be loaded into the cache. This allows an error to be forced if the processor ignores the cache coherency state when getting a tag hit. Additionally, the tag provides information as to whether the cache segment is preloaded, which cannot be determined merely by examining the coherency state. Since there are less restrictions for instructions, instructions may be randomly loaded into L2 and L3 caches where there are available entries.

To make sure that all cache state combinations have been generated by the cache preloader in the random simulation environment, the occurence of each combination should be tracked. From the statistics, it may be possible to determine why some coherency state combinations occur more often than others, or why some combinations never show up. A feedback loop to the preloader to generate a better random number sequence with the goal of ensuring that each combination is equally generated as compared to others.

The present invention provides a very efficient mechanism for solving an important problem in multi-processor, multilevel cache hierarchy system simulation. Legal cache coherency state combinations are randomly selected from predefined combinations for each data word in the test case. Cache coherency rules for preloading the data words and instructions are then followed. A tracking mechanism helps guarantee that all cache coherency state combinations have been generated and tested in a random simulation environment before tapeout. This aids is significantly reducing or eliminating multiprocessor bugs which only occur when the caches (L1/L2/L3 or more) are in some corner case states. Cache and multiprocessor related bug-escape rates may be significantly reduced while simulation cycles are saved, reducing the design cycle.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

APPENDIX I

| Processing Unit 1 | | | | Processing Unit 2 | | |
|---|---|---|---|---|---|---|
| L1 | L2 | L3 | Other L1's | L1 | L2 | L3 |
| XU | INV | INV | INV | INV | INV | INV |
| XU | INV | XU | INV | INV | INV | INV |
| XU | INV | XM | INV | INV | INV | INV |
| ~~XU~~ | ~~INV~~ | ~~SH~~ | ~~INV~~ | ~~INV~~ | ~~INV~~ | ~~INV~~ |
| XU | XU | INV | INV | INV | INV | INV |
| XU | XU | XU | INV | INV | INV | INV |
| XU | XU | XM | INV | INV | INV | INV |
| ~~XU~~ | ~~XU~~ | ~~SH~~ | ~~INV~~ | ~~INV~~ | ~~INV~~ | ~~INV~~ |
| ~~XU~~ | ~~SH~~ | ± | ± | ± | ± | ± |
| XU | XM | INV | INV | INV | INV | INV |
| XU | XM | XU(SD) | INV | INV | INV | INV |
| XU | XM | XM(SD) | INV | INV | INV | INV |
| XU | XM | SH(SD) | INV | INV | INV | INV |
| SH | INV | INV | All INV's | Randomly SH or INV at any level | | |
| SH | INV | INV | 1 SH, 2 INV's | Randomly SH or INV at any level | | |
| SH | INV | INV | 2 SH's, 1 INV | Randomly SH or INV at any level | | |
| SH | INV | INV | All SH's | Randomly SH or INV at any level | | |
| SH | INV | XU | All INV's | INV | INV | INV |
| SH | INV | XU | 1 SH, 2 INV's | INV | INV | INV |
| SH | INV | XU | 2 SH's, 1 INV | INV | INV | INV |
| SH | INV | XU | All SH's | INV | INV | INV |
| SH | INV | XM | All INV's | INV | INV | INV |
| SH | INV | XM | 1 SH, 2 INV's | INV | INV | INV |
| SH | INV | XM | 2 SH's, 1 INV | INV | INV | INV |
| SH | INV | XM | ALL SH's | INV | INV | INV |
| SH | INV | SH | All INV's | Randomly SH or INV at any level | | |
| SH | INV | SH | 1 SH, 2 INV's | Randomly SH or INV at any level | | |
| SH | INV | SH | 2 SH's, 1 INV | Randomly SH or INV at any level | | |
| SH | INV | SH | All SH's | Randomly SH or INV at any level | | |
| SH | XU | INV | All INV's | INV | INV | INV |
| SH | XU | INV | 1 SH, 2 INV's | INV | INV | INV |
| SH | XU | INV | 2 SH's, 1 INV | INV | INV | INV |
| SH | XU | INV | All SH's | INV | INV | INV |
| SH | XU | XU | All INV's | INV | INV | INV |
| SH | XU | XU | 1 SH, 2 INV's | INV | INV | INV |
| SH | XU | XU | 2 SH's, 1 INV | INV | INV | INV |
| SH | XU | XU | All SH's | INV | INV | INV |
| SH | XU | XM | All INV's | INV | INV | INV |
| SH | XU | XM | 1 SH, 2 INV's | INV | INV | INV |
| SH | XU | XM | 2 SH's, 1 INV | INV | INV | INV |
| SH | XU | XM | All SH's | INV | INV | INV |
| ~~SH~~ | ~~XU~~ | ~~SH~~ | ± | ± | ± | ± |
| SH | SH | INV | All INV's | Randomly SH or INV at any level | | |
| SH | SH | INV | 1 SH, 2 INV's | Randomly SH or INV at any level | | |
| SH | SH | INV | 2 SH's, 1 INV | Randomly SH or INV at any level | | |
| SH | SH | INV | All SH's | Randomly SH or INV at any level | | |
| SH | SH | SH | All INV's | Randomly SH or INV at any level | | |
| SH | SH | SH | 1 SH, 2 INV's | Randomly SH or INV at any level | | |
| SH | SH | SH | 2 SH's, 1 INV | Randomly SH or INV at any level | | |
| SH | SH | SH | All SH's | Randomly SH or INV at any level | | |
| ~~SH~~ | ~~SH~~ | ~~XM~~ | ~~SH/INV~~ | ~~INV~~ | ~~INV~~ | ~~INV~~ |
| ~~SH~~ | ~~SH~~ | ~~XU~~ | ~~SH/INV~~ | ~~INV~~ | ~~INV~~ | ~~INV~~ |
| SH | XM | INV | All INV's | INV | INV | INV |
| SH | XM | INV | 1 SH, 2 INV's | INV | INV | INV |
| SH | XM | INV | 2 SH's, 1 INV | INV | INV | INV |
| SH | XM | INV | All SH's | INV | INV | INV |
| SH | XM | XM(SD) | All INV's | INV | INV | INV |

APPENDIX I-continued

| Processing Unit 1 | | | | Processing Unit 2 | | |
|---|---|---|---|---|---|---|
| L1 | L2 | L3 | Other L1's | L1 | L2 | L3 |
| SH | XM | XM(SD) | 1 SH, 2 INV's | INV | INV | INV |
| SH | XM | XM(SD) | 2 SH's, 1 INV | INV | INV | INV |
| SH | XM | XM(SD) | All SH's | INV | INV | INV |
| SH | XM | XU(SD) | All INV's | INV | INV | INV |
| SH | XM | XU(SD) | 1 SH, 2 INV's | INV | INV | INV |
| SH | XM | XU(SD) | 2 SH's, 1 INV | INV | INV | INV |
| SH | XM | XU(SD) | All SH's | INV | INV | INV |
| SH | XM | SH(SD) | All INV's | INV | INV | INV |
| SH | XM | SH(SD) | 1 SH, 2 INV's | INV | INV | INV |
| SH | XM | SH(SD) | 2 SH's, 1 INV | INV | INV | INV |
| SH | XM | SH(SD) | All SH's | INV | INV | INV |
| XM | INV | INV | INV | INV | INV | INV |
| XM | INV | XU(SD) | INV | INV | INV | INV |
| XM | INV | XM(SD) | INV | INV | INV | INV |
| XM | INV | SH(SD) | INV | INV | INV | INV |
| XM | XU(SD) | INV | INV | INV | INV | INV |
| XM | XU(SD) | XU(SD) | INV | INV | INV | INV |
| XM | XU(SD) | XM(SD) | INV | INV | INV | INV |
| ~~XM~~ | ~~XU(SD)~~ | ~~SH(SD)~~ | ± | ± | ± | ± |
| XM | XM(SD) | INV | INV | INV | INV | INV |
| XM | XM(SD) | XU(SD) | INV | INV | INV | INV |
| XM | XM(SD) | XM(SD) | INV | INV | INV | INV |
| | | | All 4 L1's are INV's | | | |
| INV | INV | INV | INV | Randomly SH or INV at any level | | |
| INV | INV | INV | XU | INV | INV | INV |
| INV | INV | INV | XM | INV | INV | INV |
| INV | INV | INV | SH | Randomly SH or INV at any level | | |
| INV | XU | INV | INV | INV | INV | INV |
| INV | XU | XU | INV | INV | INV | INV |
| INV | XU | XM | INV | INV | INV | INV |
| ~~INV~~ | ~~XU~~ | ~~SH~~ | ~~INV~~ | ~~INV~~ | ~~INV~~ | ~~INV~~ |
| INV | SH | INV | INV | Randomly SH or INV at any level | | |
| INV | SH | SH | INV | Randomly SH or INV at any level | | |
| ~~INV~~ | ~~SH~~ | ~~XU~~ | ± | ± | ± | ± |
| ~~INV~~ | ~~SH~~ | ~~XM~~ | ± | ± | ± | ± |
| INV | XM | INV | INV | INV | INV | INV |
| INV | XM | XU | INV | INV | INV | INV |
| INV | XM | SH | INV | INV | INV | INV |
| INV | XM | XM | INV | INV | INV | INV |

What is claimed is:

1. A method of preloading coherency state combinations in a multiprocessor data processing system having a multi-level storage hierarchy, comprising:

dividing possible, legal coherency state combinations into classes based on a coherency state of a first cache;

defining unique coherency state combinations within the classes as subclasses;

for data words within a test case, selecting a subclass coherency state combination for preloading caches within a storage hierarchy; and tracking the coherency state combinations preloaded during a simulation.

2. The method of claim 1, wherein the step of dividing possible, legal coherency state combinations into classes based on a coherency state of a first cache further comprises:

dividing the possible, legal coherency state combinations into classes based on a coherency state of an L1 cache.

3. The method of claim 1, wherein the step of defining unique coherency state combinations within the classes as subclasses further comprises:

combining coherency state combination in which similar caches are in the same coherency state in a single subclass.

4. The method of claim 1, wherein the step of selecting a subclass coherency state combination for preloading caches within a storage hierarchy further comprises:

randomly selecting a subclass coherency state combination from the defined subclasses.

5. The method of claim 1, wherein the step of selecting a subclass coherency state combination for preloading caches within a storage hierarchy further comprises:

selecting a subclass coherency state combination from a combination table.

6. The method of claim 1, further comprising:

loading a test case with each cache within the storage hierarchy set to a coherency state specified by the selected coherency state combination.

7. The method of claim 1, further comprising:

loading caches with stale data when any higher level cache is in the modified state.

8. The method of claim 7, wherein the step of loading at least one cache within the storage hierarchy with stale data for the test case further comprises:

inverting a portion of the data word for the test case to form the stale data.

9. The method of claim 7, wherein the step of loading at least one cache within the storage hierarchy with stale data for the test case further comprises:

inverting the entire data word for the test case to form the stale data.

10. The method of claim 1, further comprising:

ensuring that all subclasses of coherency state combinations are preloaded during a simulation.

11. A computer program product within a computer usable medium for preloading coherency state combinations in a simulation of a multiprocessor data processing system having a multi-level storage hierarchy, comprising:

a combination table within the computer usable medium dividing possible, legal coherency state combinations into classes based on a coherency state of a first cache and defining unique coherency state combinations within the classes as subclasses;

instructions within the computer usable medium, for data words within a test case, for selecting a subclass coherency state combination for preloading caches within a storage hierarchy; and instructions within the computer usable medium for tracking the coherency state combinations preloaded during a simulation.

12. The computer program product of claim 11, wherein the combination table further comprises:

possible, legal coherency state combinations divided into classes based on a coherency state of an L1 cache.

13. The computer program product of claim 11, wherein the combination table further comprises:

a single subclass for coherency state combinations in which similar caches are in the same coherency state.

14. The computer program product of claim 11, wherein the instructions for selecting a subclass coherency state combination for preloading caches within a storage hierarchy further comprise:

instructions for randomly selecting a subclass coherency state combination from the defined subclasses.

15. The computer program product of claim 11, wherein the instructions for selecting a subclass coherency state combination for preloading caches within a storage hierarchy further comprise:

instructions for selecting a subclass coherency state combination from the combination table.

16. The computer program product of claim 11, further comprising:

instructions within the computer usable medium for loading a test case with each cache within the storage hierarchy set to a coherency state specified by the selected coherency state combination.

17. The computer program product of claim 11, further comprising:

instructions within the computer usable medium for loading caches within the storage hierarchy with stale data when any higher level cache is in the modified state.

18. The computer program product of claim 17, wherein the instructions for loading at least one cache within the storage hierarchy with stale data for the test case further comprise:

instructions for inverting a portion of the data word for the test case to form the stale data.

19. The computer program product of claim 17, wherein the instructions for loading at least one cache within the storage hierarchy with stale data for the test case further comprise:

instructions for inverting the entire data word for the test case to form the stale data.

20. The computer program product of claim 11, further comprising:

instructions within the computer usable medium for ensuring that all subclasses of coherency state combinations are preloaded during a simulation.

* * * * *